Sept. 24, 1957     R. W. JENKINS ET AL     2,807,657
METHOD OF MAKING A THERMOPILE
Filed Dec. 21, 1953
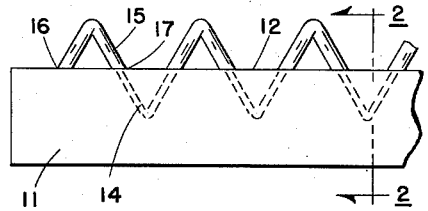
FIG. 1
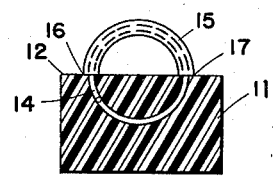
FIG. 2
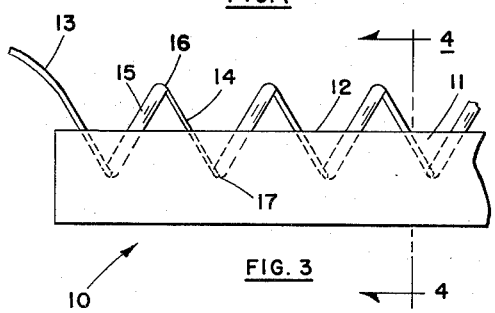
FIG. 3
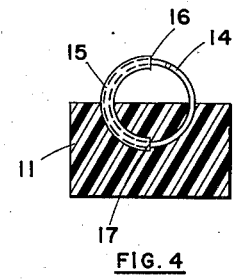
FIG. 4
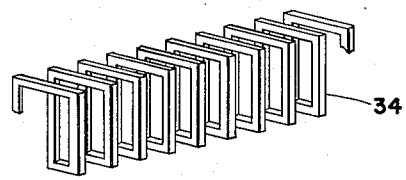
FIG. 5
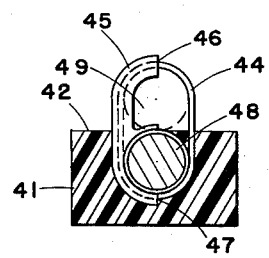
FIG. 6
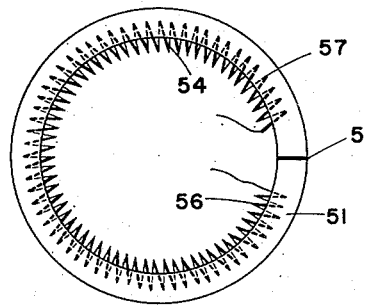
FIG. 7
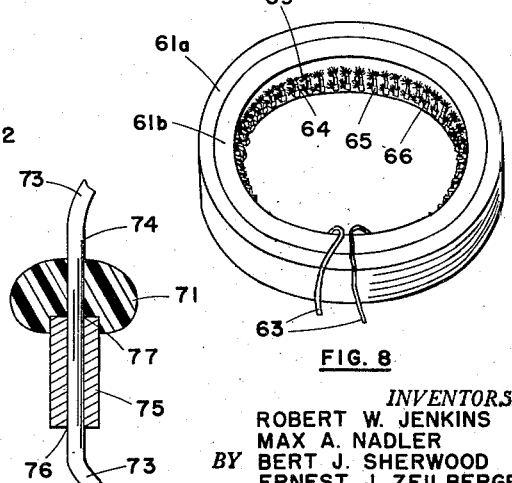
FIG. 8
FIG. 9
*INVENTORS.*
ROBERT W. JENKINS
MAX A. NADLER
BY BERT J. SHERWOOD
ERNEST J. ZEILBERGER
William R Lane
ATTORNEY United States Patent Office 2,807,657
Patented Sept. 24, 1957

2,807,657

METHOD OF MAKING A THERMOPILE

Robert W. Jenkins, Downey, Max A. Nadler, Compton, Bert J. Sherwood, Lakewood, and Ernest J. Zeilberger, Los Angeles, Calif., assignors to North American Aviation, Inc.

Application December 21, 1953, Serial No. 399,474

2 Claims. (Cl. 136—4)

This invention concerns the development of a thermopile having novel features of construction. The invention further contemplates a novel process for making a thermopile. More particularly, the invention resides in providing a thermopile in the form of a helical coil with certain sections of that coil plated with a dissimilar metal. The term "thermocoil" is used to describe the instant miniaturized and simplified thermopile.

A thermopile may be simply defined as a series of thermocouples, each of which generates a small E. M. F. due to temperature differences at the junctions of two dissimilar metals. The instant disclosed thermopiles and thermocouples are of general applicability in the field of temperature control wherein a particular temperature generates a usable voltage. A specific use of the disclosed thermopile is in rocket applications wherein a thermopile is used to trigger a fuel injector system when a certain temperature is reached in a preheated reaction chamber.

Heretofore, thermopiles have been made by placing a number of conventional thermocouples in series. Conventional thermocouples are usually made by fusing two dissimilar metals together to form a hot junction, and connecting the other ends of the metals to leads forming a cold junction. The sum of all the E. M. F.'s generated by each of the thermocouples represents the E. M. F. of the over-all thermopile.

Thus, the principal object of this invention is to provide a new and novel thermopile and thermocouple and a method of making same.

A further object of this invention is to provide a novel helical type thermopile.

A still further object of this invention is to provide a thermocoil made up of a plurality of new and novel thermocouples integrally connected.

Another object of this invention is to provide a new and novel thermocouple which is peculiarly adapted for use in a thermopile.

A further object of this invention is to provide a thermocouple and thermopile in which one metal is plated on another metal.

A still further object of this invention is to provide a thermocouple and thermopile in which a dissimilar metal is plated on a base metal, and a cold junction is formed by embedding a junction of dissimilar metal and base metal in an insulating mass.

Other objects of invention will become apparent from the following description taken in connection with the accompanying drawings, in which Fig. 1 represents an intermediate stage in the manufacture of the thermocoil hereinafter described;

Fig. 2 represents a cross-sectional view taken on the lines 2—2 in Fig. 1;

Fig. 3 represents a perspective view of a completed thermopile;

Fig. 4 represents a cross-sectional view taken on the lines 4—4 in Fig. 3;

Fig. 5 represents an alternative shaped coil;

Fig. 6 represents a modified type of thermopile;

Fig. 7 represents a circular adaptation of the basic thermocoil;

Fig. 8 represents a thermocoil having a modified base structure;

And Fig. 9 represents a single thermocouple using the basic principles of the invention.

The instant invention when applied to a thermopile construction is best illustrated in Figs. 3 and 4. The thermopile 10 includes a base portion 11 having a top surface 12, a helical coil of wire 14, a plating 15 of a metal dissimilar to the wire metal over approximately one-half of each revolution of such coil, and leads 13 extending from said coil. The helical coil is embedded or enclosed in the insulating base 11 so that a junction 17 between a plated and non-plated portion is in said base, while the other junction 16 is outside said base. It is preferable that the junctions have approximately a straight line locus in the longitudinal plane of the extended coil and be situated 90° from surface 12. This insures that each of the junctions 17 is embedded to a maximum extent in the insulating mass and that the temperature differential between the hot and cold junctions is at a maximum.

Figs. 1 and 2 represent an intermediate stage in the preferred technique of manufacturing the above-described thermocouple. The wire 14 is first helically coiled or wound about a removable mandrel. The wire 14 is heated, preferably by its own resistance, and partially pressed into a protective mass or is masked partially by any conventional masking material. Approximately one-half of the helix cross-section throughout the length of the helix is masked or protected from the ensuing plating step. The plating step is not limited to electroplating, but encompasses such method steps as evaporating, spraying, painting, or coating in any manner. The exposed alternating half-sections of the helix are then plated with a metal dissimilar to the metal used in the wire helix. In Figs. 1 and 2 the plating is shown at 15 and the embedded wire at 14. The coated wire is then removed from the protective mass, reoriented 90° by turning the helix one-quarter of a turn, and embedded in a plastic or any insulating mass 11 so that alternating junctions 16 and 17 are within and without the mass 11 and form hot and cold junctions, respectively, for the thermocoil.

It is to be understood that the plated helical wire may be removed from the protective mass and embedded in the insulation mass by having the wire heated in any manner. Other methods of wire removal and reorientation of the junctions will be apparent to one skilled in the art. It is contemplated that the same mass may be used for the protective layer, prior to plating, and the final insulation base layer of the final article. It is further comprehended that other masking procedures may be used prior to the plating step.

The above-enumerated method steps result in the formation of two series of alternating junctions, each series on opposite sides of the helix. One of these series is embedded in the insulating mass to form the cold junctions of the thermocoil. The other series of junctions remain exteriorly of the mass and form the thermocoil's hot junctions.

Various materials may be used for the various components of the instant thermocoil. The base portion 11, which encloses approximately one-half the thermocoil, may be made of any type of insulation material including those of the ceramic, thermosetting, and thermoplastic type. The particular insulation chosen is usually dependent on the particular application to which the thermopile is to be put. For example, in rocket applications, the thermopile is used only once and the E. M. F. output need be for only a short duration (15–80 milliseconds). This permits the use of a thermoplastic base material which completely serves its purpose prior to failing at high temperature. Likewise, in low temperature applications the ease of fabrication, low cost, and flexibility of thermoplastics permit their use as base materials. Where it is desired that a structure be more rigid, or a greater heat differential be present between the hot and cold junctions, other insulations in the thermosetting or ceramic field may be employed.

Any two dissimilar metals may be used for the metal wire and the plating thereon. The metal wire is ordinarily of the higher resistance, and in the preferred form is a constantin wire (60% Cu—40% Ni). With the constantin wire a plating of copper is generally used. The term "plating" is meant to include a surface placed on the wire by any method, such as electroplating, evaporation, spraying, painting, or coating in any manner. The particular dissimilar metals are chosen such that a high contact potential is achieved at each junction between the two metals. A thermocoil using the copper-constantin combination in which the copper plating has a conductivity twenty-five times greater than the constantin wire, when made up using 0.01" diameter wire, sixty turns in the helix, embedded in vinylite and exposed to a high temperature will give an E. M. F. of 0.6–0.8 volt. When this thermocoil is used in rocket installations it will emit the E. M. F. for 15–80 milliseconds. Thermocoils of varying number of turns, of various diameters and various materials can be made to emit any desired E. M. F. for any desired length of time.

Fig. 5 discloses an alternative form of wire coil. The coil 34 illustrated therein is of square shape. It is to be understood that coils of rectangular, triangular, oval and other shape cross-section are encompassed by the expressions "helical coil," "helical wire," "helix" as used in the appended claims. The circular cross-section illustrated in Fig. 4, for example, is preferred due to the ease and the cost of construction.

The thermocoil illustrated in Fig. 6 is particularly adapted for installations where it is necessary to keep a continuous temperature differential between the hot and cold junctions. This is accomplished by providing a built-in cooling means in the embedded portion of the thermocoil. The thermocoil of Fig. 6 comprises a helical wire 44 which is wound about an enamel-covered copper core 48 and a removable mandrel (shown removed from the space 49). A plating 45 of a metal dissimilar to the wire metal is coated on alternative sections of the wire, as in Figs. 3 and 4. The junction 46 above the surface 42 is made the hot junction, while the junction 47 is made the cold junction by embedding approximately one-half of the coil in an insulating mass 41. The copper core 48 functions to conduct heat away from the cold junction and prevents the attainment of equilibrium conditions between the hot and cold junctions. For a further cooling effect, the copper core 48 may be made hollow and a suitable cooling medium may be passed therethrough. Where the thermocoil actuates a fuel flow the fuel itself may be passed through the hollow core in heat transfer relationship, thus preheating the fuel as well as cooling the cold junction.

Any of the disclosed modifications of the invention may be used in the circular form illustrated in Fig. 7. The ends of a thermocoil base 51 are cemented as at 52 by any conventional means. Care, of course, must be taken in dimensioning that adjacent loops 54 of the wire and junctions 56 and 57 do not touch each other.

A modification of the basic thermocoil is seen in Fig. 8. A helical coil of square cross-section 64 is plated as at 65 and is cemented at 69 into a phenolic cloth base ring 61b. A phenolic paper base ring 61a completes this construction which includes hot and cold junctions 66 and 67 (not shown) and leads 63.

An individual thermocouple embodying one aspect of the instant invention is seen in Fig. 9. A constantin wire 74 is plated intermediate its ends by a dissimilar metal 75. An insulating mass 71 covers one of the junctions between the wire and the plating forming a cold junction 77. The other junction exteriorly of the mass is the hot junction 76. Leads 73 can connect the individual thermocouple to other like thermocouples to form a thermopile, or can connect the thermocouple directly to a measuring instrument or to a means using the E. M. F. generated by the couple.

Although the invention has been described and illustrated in detail, it is to be clearly understood that the same is by way of illustration and example only and is not to be taken by way of limitation, the spirit and scope of this invention being limited only by the terms of the appended claims.

We claim:

1. The method of making a thermopile comprising the steps of winding a metal wire into a helical form, embedding approximately a longitudinal half of said helical wire form in a thermoplastic mass, plating the remainder of said helical wire form with a metal dissimilar to said wire metal, removing said partially plated wire form from said mass, and embedding one-half of said helical wire form in a thermoplastic mass at a position displaced approximately 90° rotatively around the longitudinal axis of the form from said first recited embedment, whereby a series of alternating junctions between plated and non-plated sections are within the last-mentioned thermoplastic mass and the remaining junctions are exterior of the last-mentioned thermoplastic mass.

2. The method of claim 1 including the step of heating the helical wire form during the first embedding step, the removing step and the second embedding step to facilitate entrance and removal of said wire into and out of said mass.

References Cited in the file of this patent

UNITED STATES PATENTS

| 1,666,919 | Steurer | Apr. 24, 1928 |
| 1,706,419 | Thorpe | Mar. 26, 1929 |
| 2,291,812 | Kliever | Aug. 4, 1942 |
| 2,310,026 | Higley | Feb. 2, 1943 |

FOREIGN PATENTS

| 44,294 | France | Dec. 13, 1934 |
| | (Addition to No. 748,757) | |

OTHER REFERENCES

Phys. Society of London, volume 32, 1920, pp. 326–339.